US007441235B2

(12) United States Patent
Tohdo et al.

(10) Patent No.: US 7,441,235 B2
(45) Date of Patent: Oct. 21, 2008

(54) METHOD, APPARATUS AND PROGRAM FOR TESTING CONTROL PROGRAM

(75) Inventors: Tetsuya Tohdo, Anjo (JP); Akihito Iwai, Chiryu (JP)

(73) Assignee: DENSO Corporation, Kariya (JP)

( * ) Notice: Subject to any disclaimer, the term of this patent is extended or adjusted under 35 U.S.C. 154(b) by 687 days.

(21) Appl. No.: 10/779,703

(22) Filed: Feb. 18, 2004

(65) Prior Publication Data

US 2004/0181781 A1    Sep. 16, 2004

(30) Foreign Application Priority Data

Feb. 28, 2003  (JP)  ............................. 2003-54082
Dec. 19, 2003  (JP)  ............................. 2003-423583

(51) Int. Cl.
*G06F 9/44*   (2006.01)
*G06F 11/00*  (2006.01)

(52) U.S. Cl. .................... 717/129; 717/104; 717/135; 703/21; 714/38

(58) Field of Classification Search ......... 717/104–105, 717/124–125; 703/21–22; 714/37–38
See application file for complete search history.

(56) References Cited

U.S. PATENT DOCUMENTS

| | | | | |
|---|---|---|---|---|
| 5,404,496 A | * | 4/1995 | Burroughs et al. ............. 714/28 |
| 5,456,604 A | * | 10/1995 | Olmsted et al. ................ 434/62 |
| 5,923,867 A | * | 7/1999 | Hand .......................... 703/14 |
| 5,926,638 A | | 7/1999 | Inoue |
| 6,052,524 A | * | 4/2000 | Pauna ........................... 703/22 |
| 6,145,099 A | * | 11/2000 | Shindou ........................ 714/37 |
| 6,434,741 B1 | * | 8/2002 | Mirani et al. ................ 717/124 |
| 6,502,239 B2 | | 12/2002 | Zgarba et al. |
| 6,587,995 B1 | * | 7/2003 | Duboc et al. .................... 716/4 |
| 6,708,329 B1 | * | 3/2004 | Whitehill et al. ............. 717/136 |
| 6,718,294 B1 | * | 4/2004 | Bortfeld ....................... 703/20 |
| 6,718,484 B1 | * | 4/2004 | Kodera ......................... 714/34 |
| 6,823,497 B2 | * | 11/2004 | Schubert et al. ................ 716/4 |
| 6,859,892 B2 | * | 2/2005 | Bolding et al. ................ 714/34 |
| 7,024,660 B2 | * | 4/2006 | Andrade et al. ............. 717/124 |

(Continued)

FOREIGN PATENT DOCUMENTS

EP      1111483      6/2001

(Continued)

OTHER PUBLICATIONS

Ries et al., "The Test Support Program (TSP) a real-time interactive simulation system," 1976, ACM, p. 154-165.*

(Continued)

*Primary Examiner*—Wei Y. Zhen
*Assistant Examiner*—Qing Chen
(74) *Attorney, Agent, or Firm*—Nixon & Vanderhye PC

(57) ABSTRACT

An automatic code generation section reads a control model, and generates and releases a control program which is written in the C language. At the generation of the control program, a correspondence information formation section creates correspondence information indicative of the correspondence relationship between the control model and the control program. A simulation section reads the control model and simulates its operation. A program execution section reads the control program and executes it. A synchronizing section makes synchronization, that is, a relational linkage, between the operation results of the simulation section and the program execution section based on the correspondence information.

23 Claims, 7 Drawing Sheets

U.S. PATENT DOCUMENTS

| | | | |
|---|---|---|---|
| 7,085,670 B2 * | 8/2006 | Odom et al. | 702/127 |
| 7,260,510 B2 * | 8/2007 | Sumida | 703/2 |
| 2002/0174415 A1 * | 11/2002 | Hines | 717/127 |

FOREIGN PATENT DOCUMENTS

| | | |
|---|---|---|
| JP | 9-16382 | 1/1997 |
| JP | 9-305389 | 11/1997 |

OTHER PUBLICATIONS

Watkins, Marvin L., "A Technique for Testing Command and Control Software," 1982, ACM, p. 228-232.*

Rogers et al., "A simulation testbed for comparing the performance of alternative control architectures," 1997, ACM, IEEE, p. 880-887.*

Bortolazzi et al., "Specification and Design of Electronic Control Units," Sep. 1996, IEEE.*

Axelsson, Jakob, "Methods and Tools for Systems Engineering of Automotive Electronic Architectures," Mar. 2001, IEEE, p. 114-115.*

* cited by examiner

L1 :
 //BASIC QUANTITY CALCULATION (B2)
 v1←...;
L3 :
 //CORRECTION VALUE CALCULATION (B6)
 v2←...;
L4 :
 v3←read (m1); //BASIC QUANTITY READING (B5)
L5 :
 //INJECTION TIMING CALCULATION (B7)
 v4←... (v2, v3);
L2 :
 write (m1, v1); //BASIC QUANTITY WRITING (B3)

FIG. 5

| EXECUTION POSITION CORRESPONDENCE INFORMATION | | VARIABLE CORRESPONDENCE INFORMATION | |
|---|---|---|---|
| BLOCK | LABEL | BLOCK CONNECT/STORAGE | VARIABLE |
| CRANK ANGLE TRIGGER (B1) | | | |
| BASIC QUANTITY CALCULATION (B2) | L1 | BASIC QUANTITY | v1 |
| BASIC QUANTITY WRITING (B3) | L2 | BASIC QUANTITY | v1 |
| | | BASIC QUANTITY STORING | m1 |
| CORRECTION VALUE CALCULATION (B6) | L3 | CORRECTION VALUE | v2 |
| BASIC QUANTITY READING (B5) | L4 | BASIC QUANTITY | v3 |
| | | BASIC QUANTITY STORING | m1 |
| INJECTION TIMING CALCULATION (B7) | L5 | CORRECTION VALUE | v2 |
| | | BASIC QUANTITY | v3 |
| | | INJECTION TIMING | v4 |

FIG. 6

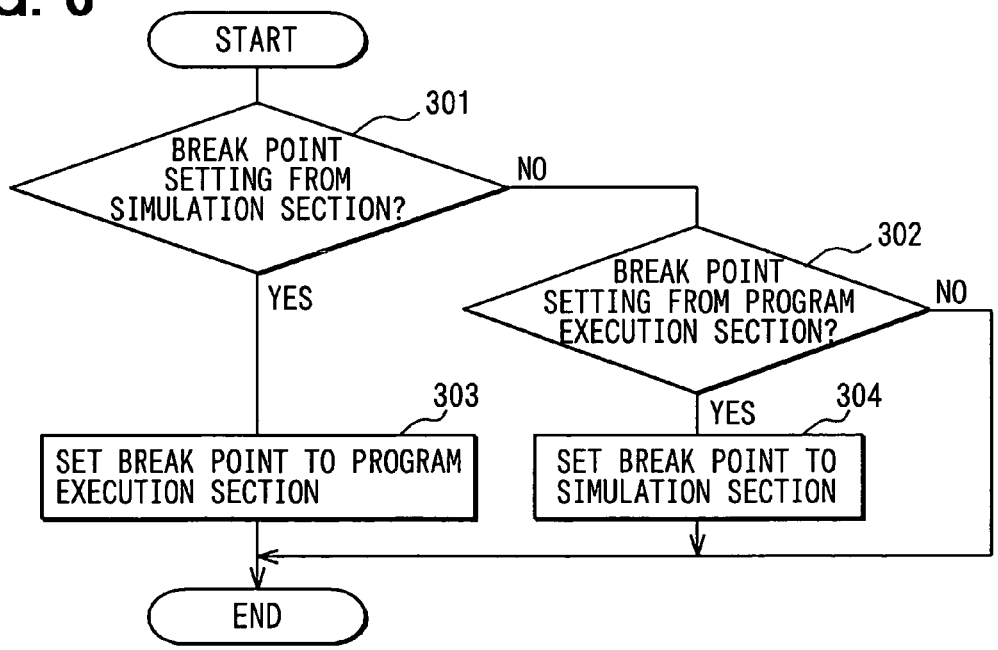

METHOD, APPARATUS AND PROGRAM FOR TESTING CONTROL PROGRAM

CROSS REFERENCE TO RELATED APPLICATION

This application is based on and incorporates herein by reference Japanese Patent Applications No. 2003-54082 filed on Feb. 28, 2003 and No. 2003-423583 filed on Dec. 19, 2003.

FIELD OF THE INVENTION

The present invention relates to a testing method for a control program which is used for controlling a control object, and a testing apparatus and a testing program which are used for testing the control program.

BACKGROUND OF THE INVENTION

The development of a control program which controls a vehicle engine, etc. for example includes generally the steps of (a) writing (coding) a control program based on design (control) specifications (control model), (b) verifying (debugging) the presence or absence of abnormality in the written control program, (c) debugging and fitting the debugged control program on a real vehicle (on-vehicle check), and (d) further modifying the control program based on the result of the on-vehicle check.

The recent trend of control program development includes the development of a model base having a step of producing automatically a control program which is written in a programming language from a control model which represents requisite specifications. In this model base development, a control model is simulated with existing software on a computer thereby to test the operational fitness of the control model.

The control program produced automatically from such a tested control model is high in completeness, enabling the reduction of correction of control program at the step of the above item (d). Constructing a control model is easier than writing a control program. Accordingly, adopting the model base development also enables to enhance the efficiency of control program development.

It is possible that an automatically-generated control program can newly provide an execution sequence of processing defined by a control model which may not correspond inherently to the control model.

On this account, adopting the above model base development will encounter the difficulty in the debugging work for the control program which has been produced automatically from the control model and in the debugging work for testing and modifying the fitness of the control model to be used for the automatic generation of control program. This is attributable to the uncertain consistency in execution sequence between the control model and the control program as described above. When any problem is found in one of the control model and the control program in the debugging work, it will be difficult to determine the spot of the other corresponding to the former problematic spot.

SUMMARY OF THE INVENTION

It is therefore an object of the present invention to provide a control program testing method which is capable of testing easily the presence or absence of abnormality in a control program or a control model in the model base development, and a testing apparatus and a testing program which are used for the control program testing.

In order to achieve the object, a control program testing method and a control program testing apparatus are designed to produced operation results of simulation which simulates the operation of a control model and operation results of program execution which executes the control program, while making a relational linkage between individual corresponding operation results, and tests the presence or absence of abnormality in at least one of the control model and the control program.

At the testing of the presence or absence of abnormality through the execution of the control program, the control program execution results and corresponding control model simulation results are produced, with the relational linkage being made between them, whereby it becomes possible to test easily the presence or absence of abnormality in the control program or control model.

BRIEF DESCRIPTION OF THE DRAWINGS

The above and other objects, features and advantages of the present invention will become more apparent from the following detailed description made with reference to the accompanying drawings. In the drawings:

FIG. 5 is a diagram showing an example of correspondence information which indicates the correspondence relationship between the control model and the control program based on this embodiment.

FIG. 6 is a flowchart showing the procedure of processing for setting break points based on this embodiment.

DETAILED DESCRIPTION OF THE PREFERRED EMBODIMENT

A control program testing method, testing apparatus and testing program of the present invention will be described in detail with reference to an embodiment applied to testing of a vehicle control program.

Figure 1:
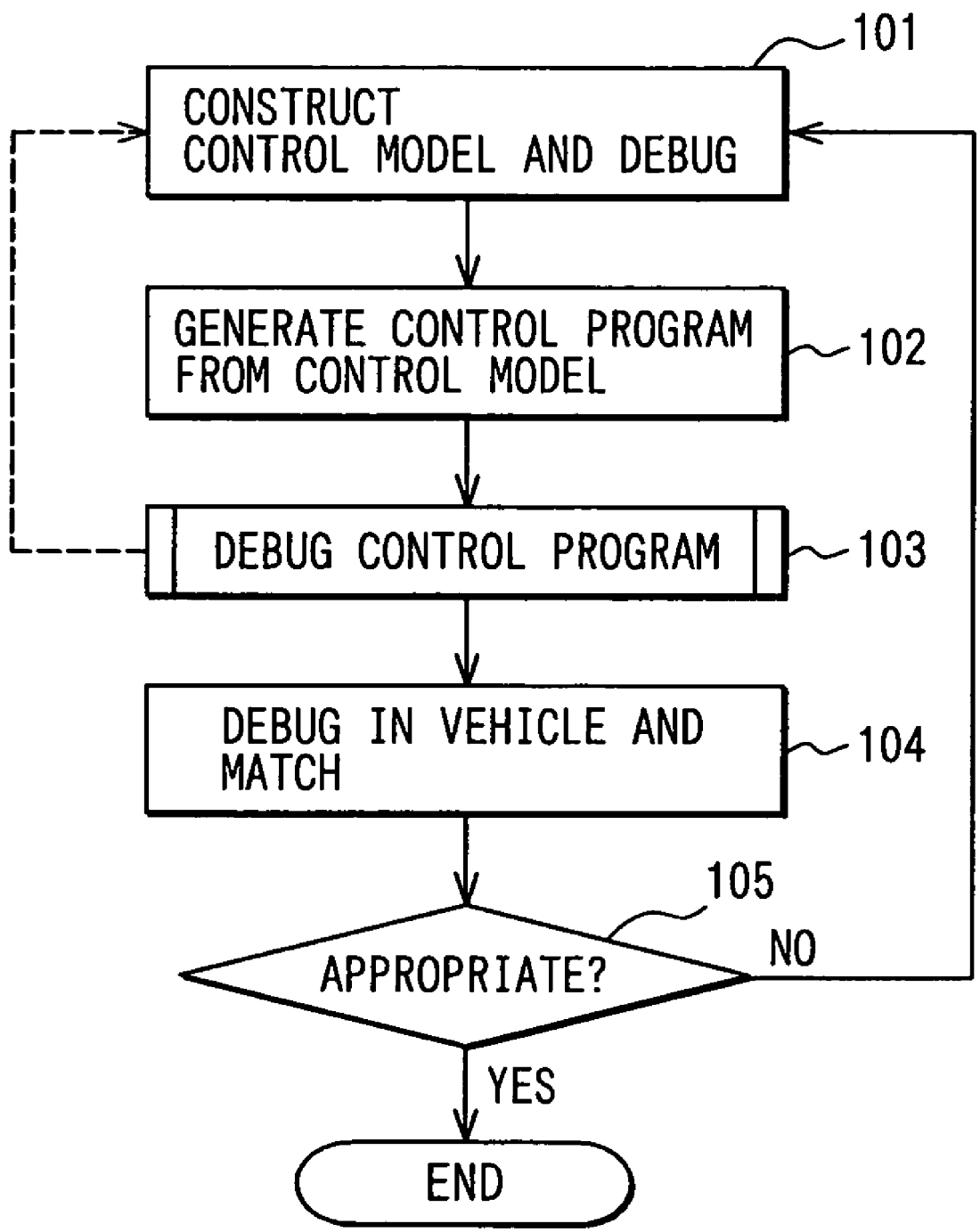
FIG. 1 is a flowchart showing the process of creation and testing of a control program based on an embodiment of the present invention.

Referring to FIG. 1, step 101 constructs, by using a requisite specifications writing language, a control model which defines the requisite specifications of a control program which is the object of testing. Next, the constructed control model undergoes the simulation to verify as to whether or not it is correct in function and proper in performance. The control model is modified based on the test result.

Next, step 102 produces automatically a control program, which is written in the C language for example, from the control model. This control program newly provides an execution sequence of processing defined by the control model which is not given inherently from the control model.

Step 103 simulates the control model and executes the control program thereby to test the presence or absence of abnormality in the control model or control program, while keeping a correspondence relationship between them. If the control program is determined to have abnormality, it is modified. In case the control model is determined to be improper as a result of testing, the process may be designed to return to step 101 to modify the control model.

On completion of debugging of the control program, step 104 implements the on-vehicle debugging and matching of the control program which is installed in the electronic control unit of the vehicle. In case step 105 determines there are improper or inappropriate portions in the control program revealed by the on-vehicle debugging, the process returns to step 101 to modify the control model, and the processing of step 101 through step 104 are repeated. This series of processing takes place until the control program is determined to be appropriate at step 105.

The debugging work of the step 103 for the control program is described next in detail.

Figure 2:
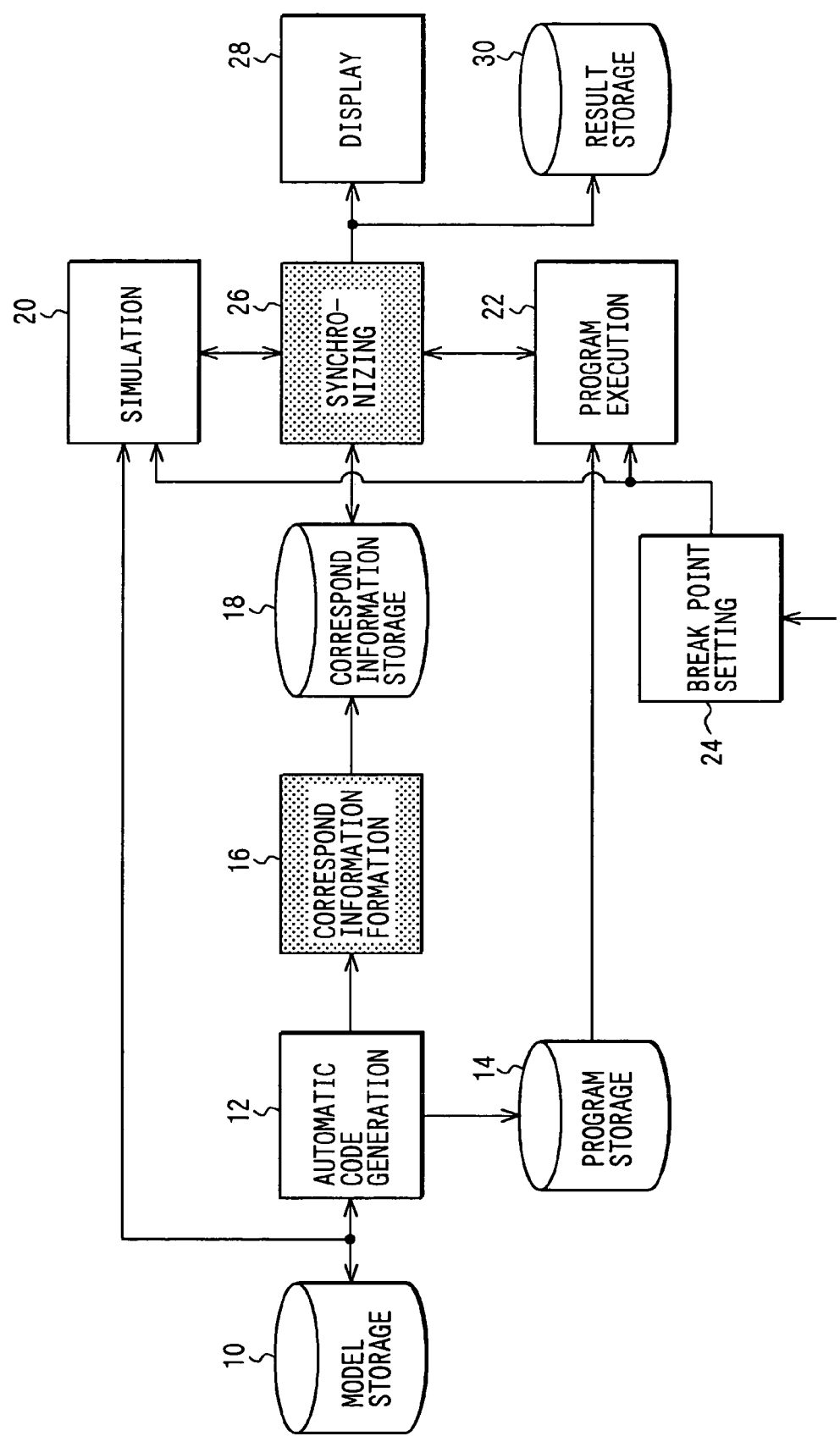
FIG. 2 is a block diagram showing the arrangement of the system which performs the creation and testing of the control program based on this embodiment.

FIG. 2 is a diagram showing the overall arrangement of a system (testing apparatus) which is used for the control program generation and debugging.

Figures 3, 4:
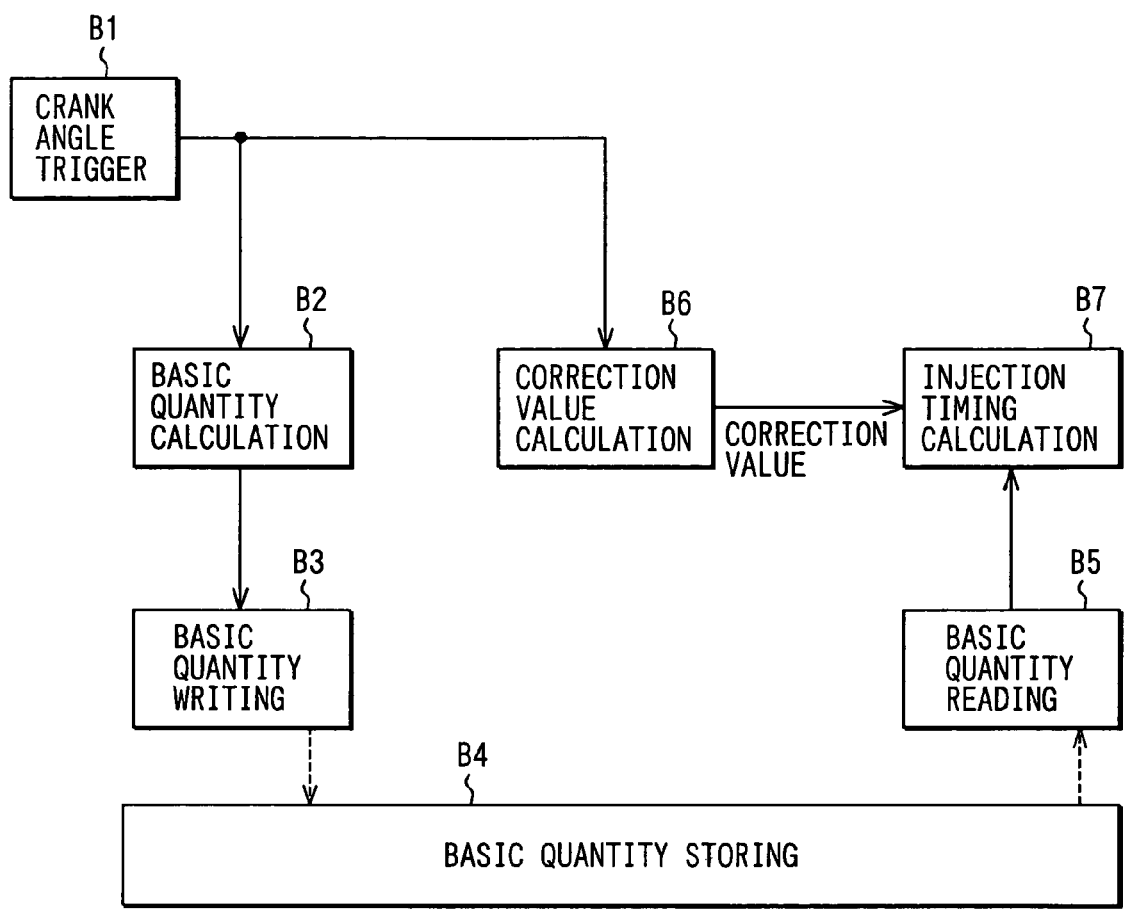
FIG. 3 is a block diagram showing an example of control model.
FIG. 4 is a diagram showing an example of control program which is generated automatically.

In this system, the control model which has been constructed and tested in Step 1 of FIG. 1 is stored in a model storage section 10. FIG. 3 shows schematically an example of a control model.

The control model shown in FIG. 3 is a model which calculates the fuel injection quantity and injection timing of a vehicle engine. Block 1 (B1) is a block which sends a trigger to Block 2 and Block 6 when the crank angle of the engine (not shown) coincides with the specified crank angle. Block 2 is a block which calculates a basic injection quantity by being triggered at the specified crank angle. Block 3 is a block which prompts the writing of the basic injection quantity, which is calculated by the Block 2, to Block 4. Block 4 is a block which stores the basic injection quantity. Block 5 is a block which reads out the stored basic injection quantity. Block 6 is a block which calculates a correction value for the base fuel injection quantity by being triggered at the specified crank angle. Block 7 is a block which calculates the injection timing based on the correction value and the read-out basic injection quantity.

In FIG. 3, the solid-line arrows define the sequence of processing and also show the flow of processed data. Specifically, for example, the order of processing is defined such that the processing of Block 7 takes place after the processing of Block 5 and Block 6. However, the order of processing of Block 2 and Block 6 is not defined. Similarly, the order of processing of Block 3 and Block 5, i.e., writing of basic injection quantity to the memory and readout of it from the memory is not defined. Accordingly, it is conceivable for this model that the processing of Block 5 takes place earlier and the processing of Block 3 takes place later.

In the system shown in FIG. 2, an automatic code generation section (automatic code generation means) 12 is a section which reads the control model, produces the control program written in the C language from the control model, and stores the program in a program storage section 14. The program storage section 14 stores control programs which have been generated by the automatic code generation section 12.

FIG. 4 shows an example of the control program which have been produced automatically from the control model shown in FIG. 3. As shown in FIG. 4, even though the processing for Block 3 of the control model shown in FIG. 3 needs to take place prior to the processing for Block 5, it takes place after the processing for Block 5. This is caused because the control model is not necessarily given inherently the execution sequence of processing indicated by functional blocks, but the execution sequence is newly provided by the automatic code generation section 12. Namely, FIG. 4 shows the case where the control model has not been given the execution sequence of the processing of Block 5 and Block 3 and the sequence arrangement by the automatic code generation section 12 does not result in a proper model.

In the system shown in FIG. 2, a correspondence information formation section 16 is a section which forms, at the generation of control program by the automatic code generation section 12, correspondence information which indicates the correspondence relationship between the control model and the control program based on information held by the automatic code generation section 12, and stores the formed information in a correspondence information storage section 18. The correspondence information includes execution position correspondence information indicative of the correspondence relationship between blocks of the control model and execution points of the control program, and variable correspondence information indicative of links of blocks (variables indicated by links among blocks) of the control model and correspondence relationship between storages (storing blocks such as Block 4) and variables of control program.

FIG. 5 shows an example of correspondence information which consists of the execution position correspondence information and variable correspondence information. In the example shown, the execution position correspondence information relates the blocks of the control model to the labels L1-L5 held by the control program. The variable correspondence information relates the block links and storages of the control model to the variables of the control program. These sets of correspondence information are stored in the correspondence information storage section 18 shown in FIG. 2.

In the system shown in FIG. 2, a simulation section (simulation means) 20 is a section which reads the control model from the model storage section 10 and simulates the operation of the model.

In the system shown in FIG. 2, a program execution section (program execution means) 22 is a section which reads a control program from the program storage section 14 and executes the program. This embodiment uses a compiler having a debugger function for the program execution section 22.

In this system, a break point setting section 24 is a section which instructs the simulation section 20 and program execution section 22 to set break points which specify operation suspend points of one of the control model and control program in accordance with the external input. Break points can be set individually for the blocks of the control model. Break points can be set, for example, at individual execution points which are specified by use of the labels L1-L5 of the control program.

In the system shown in FIG. 2, a synchronizing section (synchronizing means) 26 is a section which has a function of setting, when a break point for specifying an operation suspend point has been set to one of the control model and control program through the break point setting section 24, a break point for specifying a corresponding operation suspend point to the other based on the correspondence information. In this embodiment, a break point is set, by using execution position correspondence information among the correspondence information, by searching for an execution point of a corresponding control program from the block of control model or by searching the block of control model from an execution point of control program.

The synchronizing section 26 further includes a comparing section (comparing means) which, when the operation of both the simulation section 20 and program execution section 22 suspend temporarily at break points, compares the operation results of the simulation section 20 and program execution section 22.

In the system shown in FIG. 2, a display section (display means) 28 is a section which displays visually the ordinary operational guidance and a problem of the control model or control program detected as inconsistency in the result of comparison by the comparing section. A result storage section 30 stores the comparison result provided by the comparing section.

The model storage section 10, program storing section 14, correspondence information storage section 18, and result storage section 30 of the system shown in FIG. 2 are formed of a storage unit such as a hard disk unit for example. The automatic code generation section 12, correspondence information formation section 16, simulation section 20, program execution section 22, break point setting section 24, and synchronizing section 26 are formed of a storage unit, e.g., hard disk unit or ROM, which records programs of processing procedure, and a computer.

The processes of control program testing and debugging performed by the system (testing apparatus) are executed as follows.

In this embodiment, the operation result of the simulation section 20 which simulates the control model stored in the model storage section 10 and the operation result of the program execution section 22 which executes the control program stored in the program storage section 14 are synchronized (made relational linkage) through the synchronizing section 26. When the operations of the simulation section 20 and program execution section 22 suspend at the break points, the presence or absence of abnormality in the control model or control program is tested based on comparison between the simulation result and the program execution result by the comparing section. If the control program is found to be problematic as a result of the testing, or if the control model cannot produce a proper control program, the control program or control model is modified.

By comparing the execution result of control program and the simulation result of control model, with a relational linkage being made between them, it becomes possible to determine easily the correspondence relationship between the control program, which can possibly be given an execution sequence of processing defined by the control model which is not given inherently to the control model, and the control model. Consequently, in the model base development, it becomes possible to test easily the presence or absence of abnormality in the control program and the control model.

First, the process of break point setting by the break point setting section 24 and synchronizing section 26 will be described with reference to FIG. 6. FIG. 6 is a flowchart showing the procedure of processing for break point setting by the synchronizing section 26.

In this series of processing, step 301 and step 302 determine as to which of the simulation section 20 or program execution section 22 has a break point been set through the break point setting section 24. Specifically, the synchronizing section 26 makes access to the simulation section 20 and program execution section 22 to determine the setting of break point.

On finding the setting of break point in step 301, the process proceeds to step 303. This step 303 determines, based on the execution position correspondence information, the position in the control program corresponding to the break point which has been set on the control model, and instructs the program execution section 22 to set a break point at the determined position in the control program.

If step 302 determines the setting of break point in step 302, the process proceeds to step 304. This step 304 determines, based on the execution position correspondence information, the position on the control model corresponding to the break point which has been set in the control program, and instructs the simulation section 20 to set a break point at the determined position on the control model.

In the case of ending of the processing of step 303 or step 304 or in the case of determination that a break point has not been set in step 302, the series of processing are terminated. Instead of repeating this series of processing at certain intervals, it is more preferable to implement the processing in response to the input of control model to the simulation section 20 and the input of control program to the program execution section 22.

In the case of the control model shown in FIG. 3, break points should be set individually to the Block 3 and Block 5 for example. Alternatively, a break point may be set only to Block 7 which is the final output stage.

Figure 7:
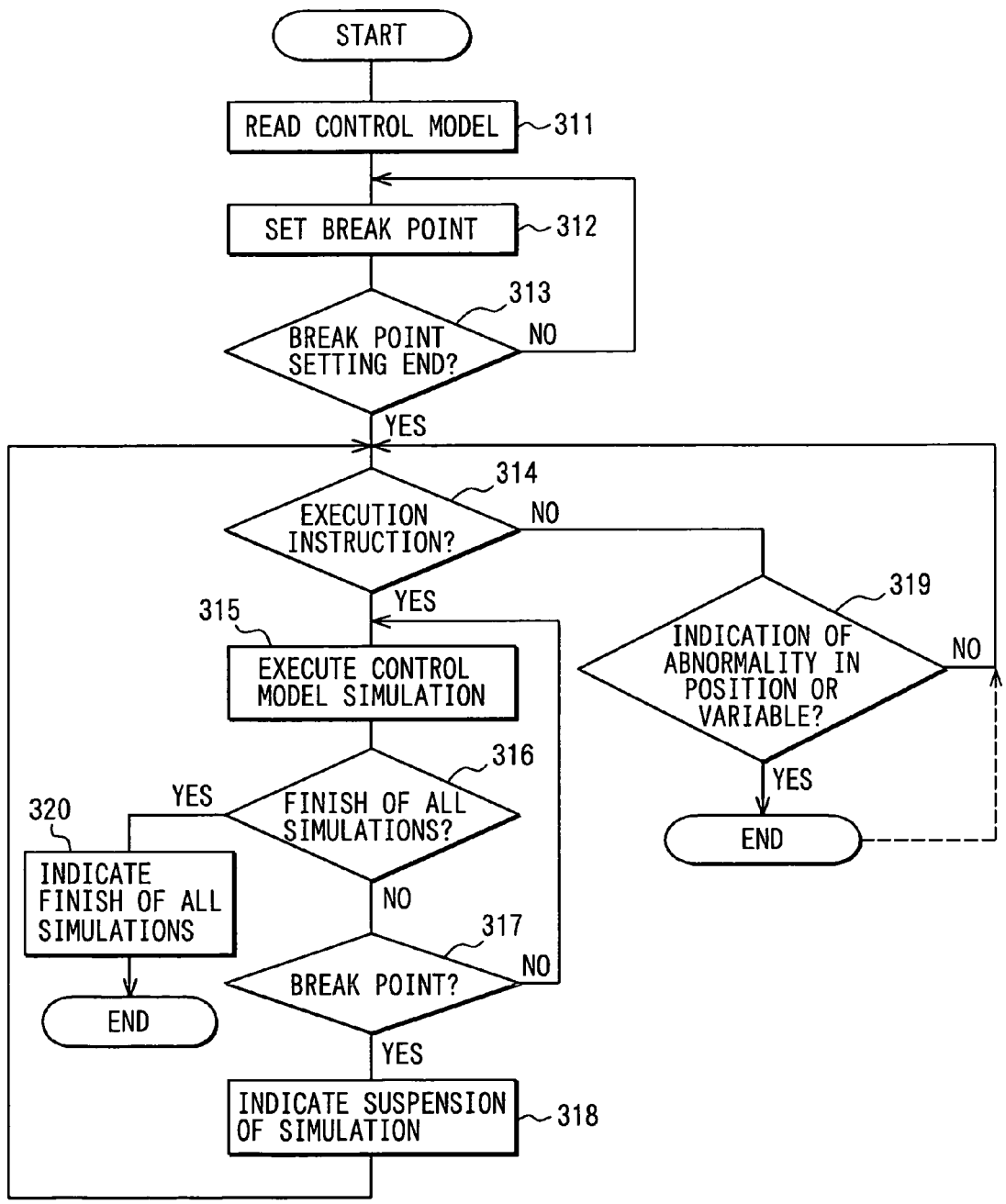
FIG. 7 is a flowchart showing the procedure of processing of the simulation section based on this embodiment.

Next, the process of control model simulation by the simulation section 20 will be described with reference to FIG. 7. FIG. 7 is a flowchart showing the procedure of processing for the simulation of control model.

In this series of processing, step 311 reads a control model which is stored in the model storage section 10. Next, step 312 and step 313 set break points at certain positions on the control model. Specifically, the step 312 and step 313 either set a break point in response to the instruction by the break point setting section 24 or set a break point in response to the instruction by the synchronizing section 26 in the process shown in FIG. 6.

The subsequent step 314 determines as to whether or not the execution of simulation is instructed by the synchronizing section 26. On detecting the instruction of execution in step 314, step 315 implements the simulation of control model. This simulation takes place such that pseudo-data for sensor signals for example is given to the simulation section 20, and it processes the data in accordance with the control model.

The simulation takes place until the whole control model is simulated (step 316), or until a break point is detected (step 317). On detecting a break point in step 317, the simulation is suspended, and step 318 indicates the suspend of simulation to the outside through the display section 28 or an output device such as an indicator equipped on the simulation section 20.

When the simulation suspends at a break point, the system waits for the instruction of another execution from the synchronizing section 26 (step 314), or an abnormality indication from the synchronizing section 26 (step 319). With another execution being instructed, the control model simulation is resumed by implementing the processing of step 315 and following steps.

In the case of abnormality indication from the synchronizing section 26 in step 319, this series of processing are terminated. At this time, the simulation section 20 holds information on the suspend point at the time of abnormality indication. It is preferably released to the outside through the display section 28 or an output device such as a display device equipped on the simulation section 20. Furthermore, in case there is an abnormality indication from the synchronizing section 26, the system may be designed to store the abnormality information in the result storage section 30 (FIG. 2) and wait for the instruction of execution from the synchronizing section 26 at step 314 (refer to the dashed line of FIG. 7).

In case this abnormality information pertains to a variable, the system may be designed to alter the variable value which has been calculated by the simulation. Specifically, the variable value calculated by the simulation is altered so that the simulation condition of control model and the execution condition of control program are made equal again, and the process is brought back to step 314 for waiting.

In case step 316 determines that the whole control model is finished, step 320 indicates the end of simulation to the outside through the display section 28 or an output device such as an indicator equipped on the simulation section 20, and this series of processing are terminated.

Figure 8:
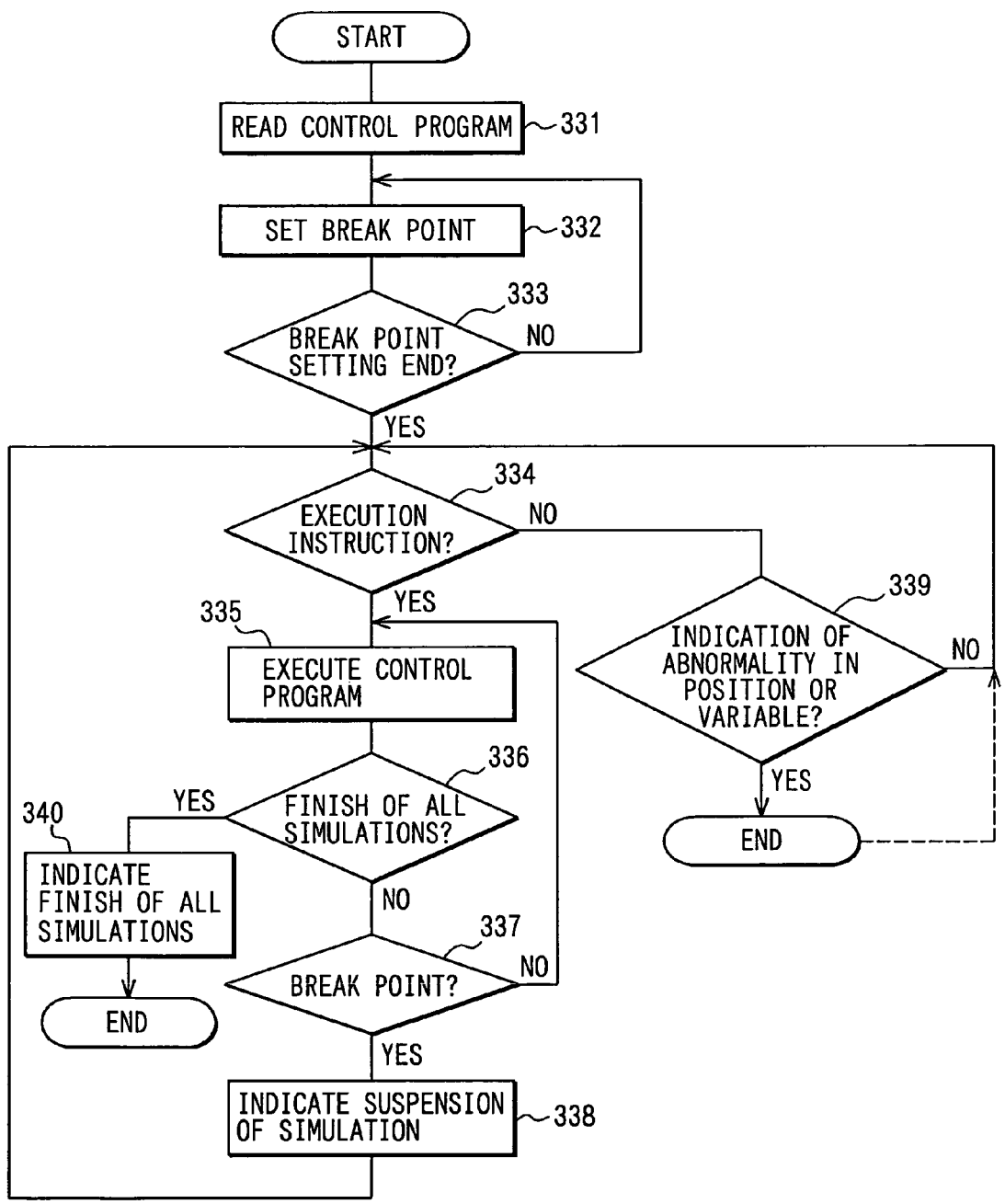
FIG. 8 is a flowchart showing the procedure of processing of the program execution section based on this embodiment.

Next, the process of control program execution by the program execution section 22 will be described with reference to FIG. 8. FIG. 8 is a flowchart showing the procedure of processing for the execution of control program.

In this series of processing, step 331 reads a control program which is stored in the program storage section 14. Next, step 332 and step 333 set break points at certain positions in the control program. Specifically, the step 332 and step 333 either set a break point in response to the instruction by the break point setting section 24 or set a break point in response to the instruction by the synchronizing section 26 in the process shown in FIG. 6.

The subsequent step 334 determines as to whether or not the execution of control program is instructed by the synchronizing section 26. On detecting the instruction of execution in step 334, step 335 executes the control program. This control program execution also takes place such that pseudo-data for sensor signals for example is given to the program execution section 22, and it processes the data in accordance with the control program.

The program execution takes place until the whole control program is finished (step 336), or until a break point is detected (step 337). On detecting a break point in step 337, the control program execution is suspended, and step 338 indicates the suspend of program execution to the outside through the display section 28 or an output device such as an indicator equipped on the program execution section 22.

When the control program execution suspends at a break point, the system waits for the instruction of another execution from the synchronizing section 26 (step 334), or an abnormality indication from the synchronizing section 26 (step 339). With another execution being instructed, the control program execution is resumed by implementing the processing of step 335.

In the case of abnormality indication from the synchronizing section 26 in step 339, this series of processing are terminated. At this time, the program execution section 22 holds information on the suspend point at the time of abnormality indication. It is preferably released to the outside through the display section 28 or an output device such as a display device equipped on the program execution section 22. Furthermore, in case there is an abnormality indication from the synchronizing section 26, the system may be designed to store the abnormality information in the result storage section 30 (FIG. 2) and wait for the instruction of execution from the synchronizing section 26 at step 334 (refer to the dashed line of FIG. 8).

In case this abnormality information pertains to a variable, the system may be designed to alter the variable value which has been calculated by the control program execution. Namely, the variable value calculated by the program execution is altered so that the simulation condition of control model and the execution condition of control program are made equal again, and the process is brought back to step 334 for waiting.

In case step 336 makes a determination of the completion of execution of the whole control program, step 340 indicates the end of control program execution to the outside through the display section 28 or an output device such as an indicator equipped on the program execution section 22, and this series of processing are terminated.

Figure 9:
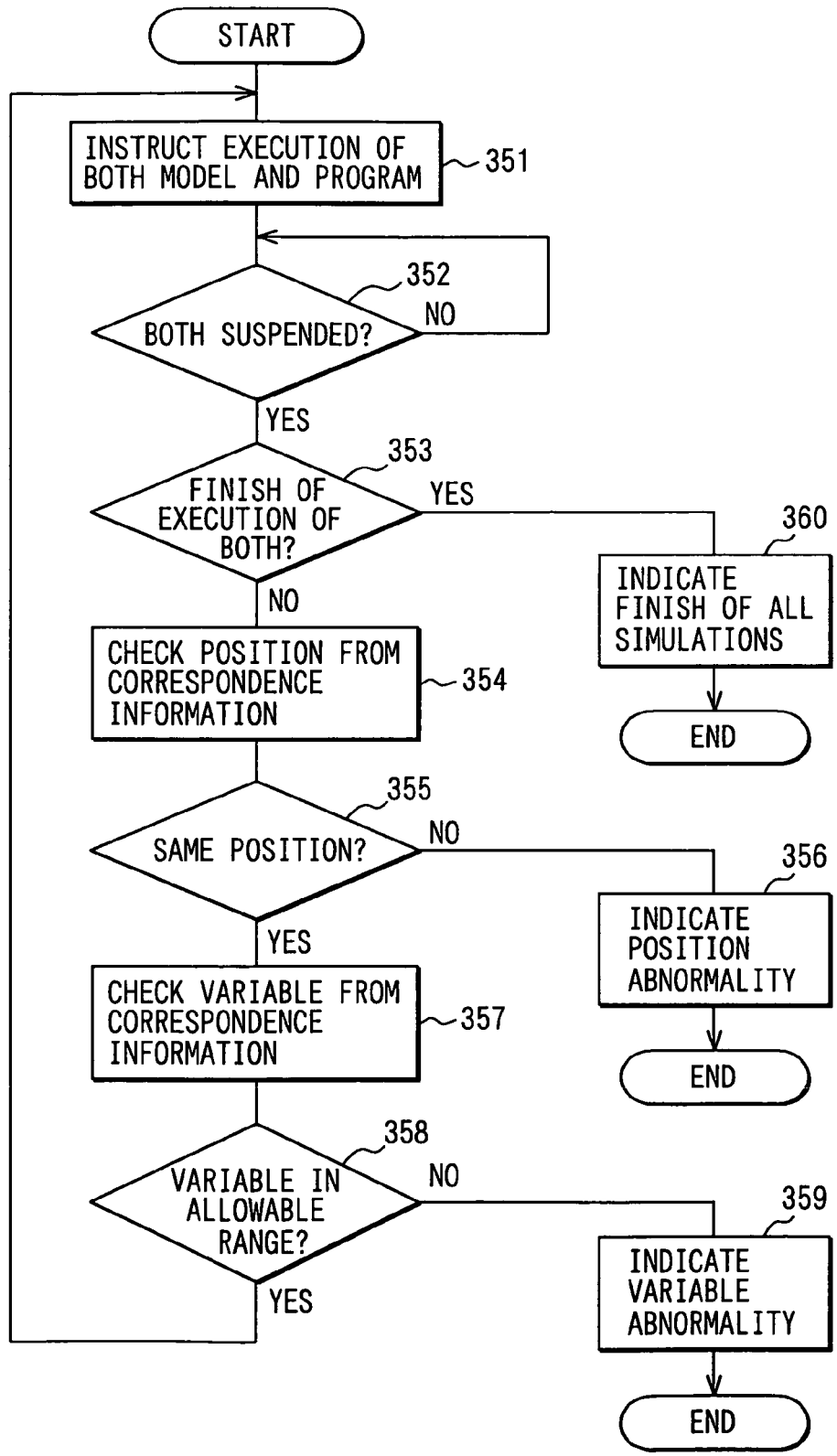
FIG. 9 is a flowchart showing the procedure of processing of the synchronizing section based on this embodiment.

Next, the process for detecting the presence or absence of abnormality in the control model and control program implemented by the synchronizing section 26 will be described with reference to FIG. 9. FIG. 9 is a flowchart showing the procedure of processing of this testing. This process takes place on condition that the process shown in FIG. 6 has ended, namely, on condition that break points have been set on the control model and in the control program.

In this series of processing, step 351 instructs the simulation section 20 to simulate the control model and instructs the program execution section 22 to execute the control program. The simulation of control model and the execution of control program take place until the control model is suspended by the simulation section 20 and the control program is suspended by the program execution section 22. The control model and control program are given the same input data (initial values) so that the simulation of control model and the execution of control program take place in the same condition.

If step 352 determines that both the control model and control program have suspended and step 353 determines that the executions of the model and program have not yet completed, the processing of step 354 and following step to test the presence or absence of abnormality in the control model and control program.

Specifically, step 354 checks based on the execution position correspondence information as to whether or not the suspend point of control model and the suspend point of control program are correspondent positions. On determining their positions to be not in correspondence with each other (step 355), step 356 indicates through the display section 28 that the suspend points of the control model and control program are not consistent ("abnormal suspend points").

When step 355 determines the suspend points to be the same or consistent, the process proceeds to the processing of step 357. This step 357 determines based on the variable correspondence information as to whether or not the value of block link or storage (variable value) at the suspend point of the control model and the variable value held at the suspend point of the control program are in correspondence with each other. If their values are determined to be not in correspondence with each other (step 358), step 359 indicates through the display section 28 that the value of block link or storage of the control model and variable value of the control program are not in correspondence with each other ("abnormal variable value").

Determination as to whether or not the value of block link or storage of the control model and the variable value of the control program are in correspondence with each other is based on determination as to whether or not the difference between these values is within the allowable range which has been determined in advance. For example, in case the value of block link or storage of the control model and the variable value of the control program are both values resulting from integer calculation, only their equality is accepted to be within the allowable range. In case the value of block link or storage of the control model and the variable value of the control program are both values of floating point type, their difference in absolute value smaller than a prescribed value is accepted to be within the allowable range.

When the variable values are determined to be within the allowable range in step 358, the process returns to step 351 to resume the simulation of control model and the execution of control program. When step 353 determines that the whole control model and control program have been finished, step 360 indicates the affair ("end of whole model and program").

On completion of processing of the step 356, step 359 and step 360, this series of processing are terminated. Alternatively, when the finish of the whole control model and control program is determined at the step 353, the processing of step 357, etc. may be implemented prior to shifting to the processing of step 360.

This embodiment is designed to determine with the synchronizing section 26 (comparing section) as to whether or not the suspend point of control model and the suspend point of control program are in correspondence with each other. Consequently, when the control program generated by the automatic code generation section 12 newly provides an execution sequence for multiple processing defined by the control model, it is possible to detect the improperness of the sequence.

In case the processing sequence is erroneous or in case the generated control program itself is erroneous, the difference of variable values can be detected by the process of FIG. 9.

According to this embodiment, when a problem is detected in the debugging work of control program, it is possible to make automatically a relational linkage with the position of control model and processing state (block link and storage) of control model.

As a result of debugging of the control program by the work described above, i.e., the processing of step 3 shown in FIG. 1, when the control program is determined to be proper, the control program is stored on a ROM (Read Only Memory) or the like, and the ROM is mounted on the electronic control unit. Subsequently, the control program installed in the electronic control unit undergoes the processing of Step 4 (FIG. 1), i.e., debugging and fitting on a real vehicle, and if the control program is determined to have abnormality, correction of the control program or control model will take place as written previously.

As described above in detail, this embodiment achieves the following advantages.

(1) When a control program undergoes the testing of the presence or absence of abnormality by being executed with the program execution section 22, the program execution is synchronized with the simulation of control model, whereby the state of simulation of the control model and the state of execution of the control program can readily be compared.

(2) By using correspondence information produced by the correspondence information formation section 16, it is possible to make properly the correspondence between the spot of simulation of control model by the simulation section 20 and the spot of execution of control program by the program execution section 22.

(3) When break points are set to one of the control model and control program, break points are set automatically to the other by the synchronizing section 26. Consequently, setting break points to one of the control model and control program selectively by the user from the outside enables the synchronizing process.

(4) Since break points can be set individually to functional blocks of control model, the presence or absence of abnormality in the generated control program can be tested easily in correspondence to the control model when the control program is newly given an execution sequence.

(5) By comparing the simulation sequence of control model and the execution sequence of control program, it becomes possible to detect automatically the abnormality regarding the inconsistency of sequences.

(6) By comparing the value produced by the simulation of control model and the value resulting from the execution of control program with the comparing section, it becomes possible to detect automatically the abnormality regarding the inconsistency of values.

(7) At an abnormality indication in regard to a variable, in case at least one of variable values of step 319 of FIG. 7 and of step 339 of FIG. 8 is made alterable, the following effectiveness is added. Namely, at a determination of the presence of abnormality in variable, it is possible to make equal again the simulation condition of control model and the execution condition of control program, and eventually it becomes possible to resume the testing of the presence or absence of abnormality from the spot of the determination of abnormality.

(8) By producing data of an inconsistent comparison result provided by the comparing section to the display section 28 to display visually, it becomes possible to for the user oneself to know easily the spot of abnormality determination.

The foregoing embodiment may be altered as follows.

Suspend points of operations of the simulation section 20 and program execution section 22 are not confined to those written above. Instead, for example, the simulation section 20 may be synchronized with the program execution section 22 which executes and suspends the control program one line at a time. This operation may be implemented by setting a break point to each line of control program, and setting break points to the control model through the process shown in FIG. 6.

The simulation section 20 and program execution section 22 are not confined to those which implement the simulation and program execution by putting in input data to the control model and control program. Instead, for example, the simulation section and program execution section may be the ones which test the control model and control program while writing a virtual control object of the control program and a virtual environment of the object on the computer.

The function of the break point setting section 24 may be included in the simulation section 20. Otherwise, it may be included in the program execution section 22.

Although, in the foregoing embodiment, the allowable range used for the testing of the presence or absence of abnormality is made alterable depending on the data type of variables, the manner of range setting is arbitrary. Setting of allowable range is not always requisite, but the criterion of the determination of the presence or absence of abnormality may solely be the equality of both variable values.

In the foregoing embodiment, it is considered to make alterable at least one of the variable values in step 319 of FIG. 7 and step 339 of FIG. 8 in the case of abnormality indication in regard to the variable. Instead, an alternative design may be that the control program is tested by intentionally putting in abnormal data as a variable value in the normal state for example.

Control programs generated automatically from control models are not confined to those written in the C language, but control programs may be written in an arbitrary programming language. If the control program can possibly be newly given an execution sequence of processing defined by the control model which is not given inherently to the control model, testing of the control program and control model in synchronism with each other is particularly effective.

In the foregoing embodiment, the synchronizing section 26 is designed to have a comparing section for comparing the simulation result of control model and the execution result of control program and produced an inconsistent comparison result to the display section 28. Alternatively, the synchronizing section 26 may be designed to receive the simulation result of control model and the execution result of control program and produced the results intact without comparison to the display section 28. Display output to the display section 28 may be direct from the simulation section 20 and program execution section 22 instead of being through the synchronizing section 26. The operation results, which are produced directly or through the synchronizing section 26, may be stored in the form of data files in an arbitrary storage unit.

Instead of arranging the correspondence information formation section 16, synchronizing section 26, etc. by means for a computer and software, they may be arranged in specialized hardware devices.

The control program testing process, which is based on the use of model base development, may be altered arbitrarily within the range of alteration in which the presence or absence of abnormality is tested by synchronizing the simulation of control model and the execution of control program.

The present invention is applicable not only to the creation of control programs for vehicle engines, but also to the case of writing control programs by adopting the model base development.

What is claimed is:

1. A control program testing method for testing a control program which is written in a certain programming language by use of an automatic code generator which produces automatically a control program which is corresponding in contents with a control model indicating a control specification and written in the certain programming language to perform the control model, with requisite control specifications thereof being written in a requisite control specifications writing language, the control program testing method comprising steps of:

producing operation results of a simulator which simulates operation of the control model and operation results of program execution section which executes the control program, while making a relational linkage between each of corresponding operation results;

comparing the operation results of the simulator and the operation results of the program execution section upon detecting suspends of simulation and program execution; and testing presence or absence of abnormality in at least one of the control model and the control program with respect to each relational linkage;

wherein said each relational linkage is made about corresponding contents between the control model and the control program based on correspondence information which indicates a correspondence relationship between the control model which is provided at automatic generation of the control program by the automatic code generator and the control program which is produced from the control model, wherein the relational linkage is made for one of the control model and the control program based on the setting of a break point which specifies a suspend point of operation and for the other based on a setting of a corresponding break point based on the correspondence information, and wherein the break point is adapted to set individually for functional blocks which constitute the control model.

2. The control program testing method as in claim 1, wherein output of operation results, with the relational linkage being made between each of corresponding operation results, is implemented based on the execution and suspend of the control program, one line at a time, by the program execution section.

3. The control program testing method as in claim 1, wherein the testing of the presence or absence of abnormality is implemented by a comparator which compares successively between the operation results of the simulator and the operation results of the program execution section in relational linkage.

4. The control program testing method as in claim 3, wherein the successive comparison between the operation results of the simulator and the operation results of the program execution section by the comparator is implemented in terms of comparison between simulation sequence of the control model and execution sequence of the control program based on the correspondence information.

5. The control program testing method as in claim 3, wherein the successive comparison between the operation results of the simulator and the operation results of the program execution section by the comparator is implemented in terms of comparison between variable values which are calculated by the simulation of the control model and variable values which are calculated by the execution of the control program based on the correspondence information.

6. The control program testing method as in claim 5, wherein the testing of the presence or absence of abnormality by comparison between the variable values which are calculated by the simulation of the control model and the variable values which are calculated by the execution of the control program based on the correspondence information is implemented in terms of determination as to whether or not the difference between the variable values calculated by the simulation of the control model and the variable values calculated by the execution of the control program is within an allowable range.

7. The control program testing method as in claim 3 further comprising the step of:

producing, in the event of determination of the presence of abnormality by the comparator, a simulation spot of the control model and an execution spot of the control program at a time point of the determination as a result of the test.

8. The control program testing method as in claim 1 further comprising the step of:

making alterable at least one of variable values held at a suspend point among the variable values calculated by the simulation of the control model and the variable values held at the suspend point among the variable values calculated by the execution of the control program when the simulation of the control model and the execution of the control program are suspended during the test.

9. The control program testing method as in claim 1 further comprising the step of:

producing at least the operation results of the simulator which simulates the operation of the control model and the operation results of the program execution section which executes the control program to a display to display visually.

10. A control program testing apparatus for testing a control program which is written in a certain programming language by use of automatic code generation means which produces automatically a control program which is corresponding in contents with a control model indicating a control specification and written in the certain programming language to perform the control model, with requisite control specifications thereof being written in a requisite control specifications writing language, the control program testing apparatus comprising:

synchronizing means which produces operation results of simulation means which simulates operation of the control model and operation results of program execution means which executes the control program, while making a relational linkage between each of corresponding operation results, the simulation means and the program execution means being operated concurrently;

comparing means for comparing the operation results of the simulation means and the operation results of the program execution means upon detecting suspends of simulation and program execution; and testing means for testing presence or absence of abnormality in at least one of the control model and the control program based on output operation results with respect to each relational linkage;

wherein the synchronizing means makes said each relational linkage about corresponding contents between the control model and the control program based on correspondence information which indicates a correspondence relationship between the control model which is provided at automatic generation of the control program by the automatic code generation means and the control program which is produced from the control model, wherein the synchronizing means makes the relational linkage for one of the control model and the control program based on the setting of a break point which specifies a suspend point of operation and for the other based on setting of a corresponding break point based on the correspondence information, and wherein the break point is set individually for functional blocks which constitute the control model and the synchronizing means causes simulation means and the program execution means to operate in a synchronized manner.

11. The control program testing apparatus as in claim 10, wherein output of operation result by the synchronizing means is implemented based on the execution and suspend of the control program, one line at a time, by the program execution means and the synchronizing means causes simulation means and the program execution means to operate in a synchronized manner.

12. The control program testing apparatus as in claim 10 further comprising:

comparing means which implements the testing of the presence or absence of abnormality by comparing successively between the operation results of the simulation means and the operation results of the program execution means in relational linkage.

13. The control program testing apparatus as in claim 12, wherein the successive comparison between the operation results of the simulation means and the operation results of the program execution means by the comparing means is implemented in terms of comparison between a simulation sequence of the control model and an execution sequence of the control program based on the correspondence information.

14. The control program testing apparatus as in claim 12, wherein the successive comparison between the operation results of the simulation means and the operation results of the program execution means by the comparison means is implemented in terms of comparison between variable values which are calculated by the simulation of the control model and variable values which are calculated by the execution of the control program based on the correspondence information.

15. The control program testing apparatus as in claim 14, wherein the testing of the presence or absence of abnormality by comparison between variable values calculated by the simulation of the control model and variable values calculated by the execution of the control program based on the correspondence information is implemented in terms of determination as to whether or not the difference between the variable values calculated by the simulation of the control model and the variable values calculated by the execution of the control program is within an allowable range.

16. The control program testing apparatus as in claim 12 further comprising:

producing, in the event of determination of the presence of abnormality by the comparing means, a simulation spot of the control model and an execution spot of the control program at a time point of the determination as a result of the test.

17. The control program testing apparatus as in claim 10 further comprising:

making alterable at least one of variable values held at a suspend point among the variable values calculated by the simulation of the control model and the variable values held at the suspend point among the variable values calculated by the execution of the control program when the simulation of the control model and the execution of the control program are suspended during the test.

18. The control program testing apparatus as in claim 10 further comprising:

display means which is adapted to display visually at least the operation results of the simulation means which simulates the operation of the control model and the operation results of the program execution means which executes the control program.

19. A computer readable medium tangibly storing therein a control program testing program which is used for testing a control program which is written in a certain programming language by use of an automatic code generator which produces automatically a control program which is corresponding in contents with a control model indicating a control specification and written in the certain programming language to perform the control model, with requisite control specifications thereof being written in a requisite control specifications writing language, the control program testing program, upon execution through a computer, performing steps comprising:

testing presence or absence of abnormality in at least one of the control model and the control program;

generating, from information provided at automatic generation of the control program, correspondence information which indicates a correspondence relationship between the control model and the control program, and making a relational linkage between each of a plurality of suspend points of operation of a simulator which simulates the control model and a corresponding one of a plurality of suspend points of operation of program execution section which executes the control program based on the correspondence information;

directing the simulator and the program execution section to proceed to the simulation and the program execution;

detecting a suspend of the simulator and a suspend of the program execution section following the simulation and program execution; and comparing a simulation result of the control model and an execution result of the control program upon detecting suspends of simulation and program execution, and testing the presence or absence of abnormality based on the comparison result with respect to each relational linkage;

wherein said each relational linkage is made about corresponding contents between the control model and the control program based on correspondence information which indicates a correspondence relationship between the control model which is provided at automatic generation of the control program by the automatic code generator and the control program which is produced from the control model, wherein the correspondence information includes execution position correspondence information which is information indicating the relationship between corresponding positions of the control model and the control program, and wherein the making a relational linkage of suspend points based on the correspondence information is that which sets, by being rendered the setting of a break point which specifies a suspend point of operation of one of the simulator and the program execution section, a break point which specifies a corresponding spot of the other based on the execution position correspondence information.

20. The computer readable medium tangibly storing therein a control program testing program as in claim 19, wherein the testing of the presence or absence of abnormality based on the comparison result tests the presence or absence of abnormality by at least comparing one of the suspend points of simulation of the control model and one of the suspend points of execution of the control program based on the execution position correspondence information.

21. The computer readable medium tangibly storing therein a control program testing program as in claim 19, wherein the correspondence information includes variable correspondence information which indicates a correspondence relationship between variable values pertaining to processing of the control model and variable values pertaining to processing of the control program, and wherein the testing of the presence or absence of abnormality based on the comparison result tests the presence or absence of abnormality by at least comparing the variable values calculated by the simulation of the control model and the variable values calculated by the execution of the control program based on the variable correspondence information.

22. A computer readable medium tangibly storing therein a control program testing program which is used for testing a control program which is written in a certain programming language by use of an automatic code generator which produces automatically a control program which is corresponding in contents with a control model indicating a control specification and written in the certain programming language to perform the control model, with requisite control specifications thereof being written in a requisite control specifications writing language, the control program testing program upon execution through a computer, performing:

testing of presence or absence of abnormality in at least one of the control model and the control program;

generating, from information provided at automatic generation of the control program, correspondence information which indicates a correspondence relationship between the control model and the control program, and making a relational linkage between each of a plurality of suspend points of operation of a simulator which simulates the control model and a corresponding one of a plurality of suspend points of operation of program execution section which executes the control program based on the correspondence information, the testing of presence or absence of abnormality in at least one of the control model and the control program being made with respect to each relational linkage;

directing the simulator and the program execution section to proceed to the simulation and the program execution;

detecting a suspend of the simulator and a suspend of the program execution section following the simulation and program execution; and producing a simulation result of the simulator and an execution result of the program execution section upon detecting suspends of simulation and program execution, and testing the presence or absence of abnormality based on a comparison result with respect to each relational linkage;

wherein said each relational linkage is made about corresponding contents between the control model and the control program based on correspondence information which indicates a correspondence relationship between the control model which is provided at automatic generation of the control program by the automatic code generator and the control program which is produced from the control model, wherein the correspondence information includes execution position correspondence information which is information indicating the relationship between corresponding positions of the control model and the control program, and wherein the making a relational linkage of suspend points based on the correspondence information is designed to set, by being rendered the setting of a break point which specifies a suspend point of operation of one of the simulator and the program execution section, a break point which specifies a corresponding spot of the other based on the execution position correspondence information.

23. The computer readable medium tangibly storing therein a control program testing program as in claim 22, wherein the producing of the simulation result of the simulator and the execution result of the program execution section comprises producing operation results to a display to display visually.

* * * * *